H. B. MUNRO.
GAME APPARATUS.
APPLICATION FILED SEPT. 20, 1909.
979,392.
Patented Dec. 20, 1910.
Fig. 1.
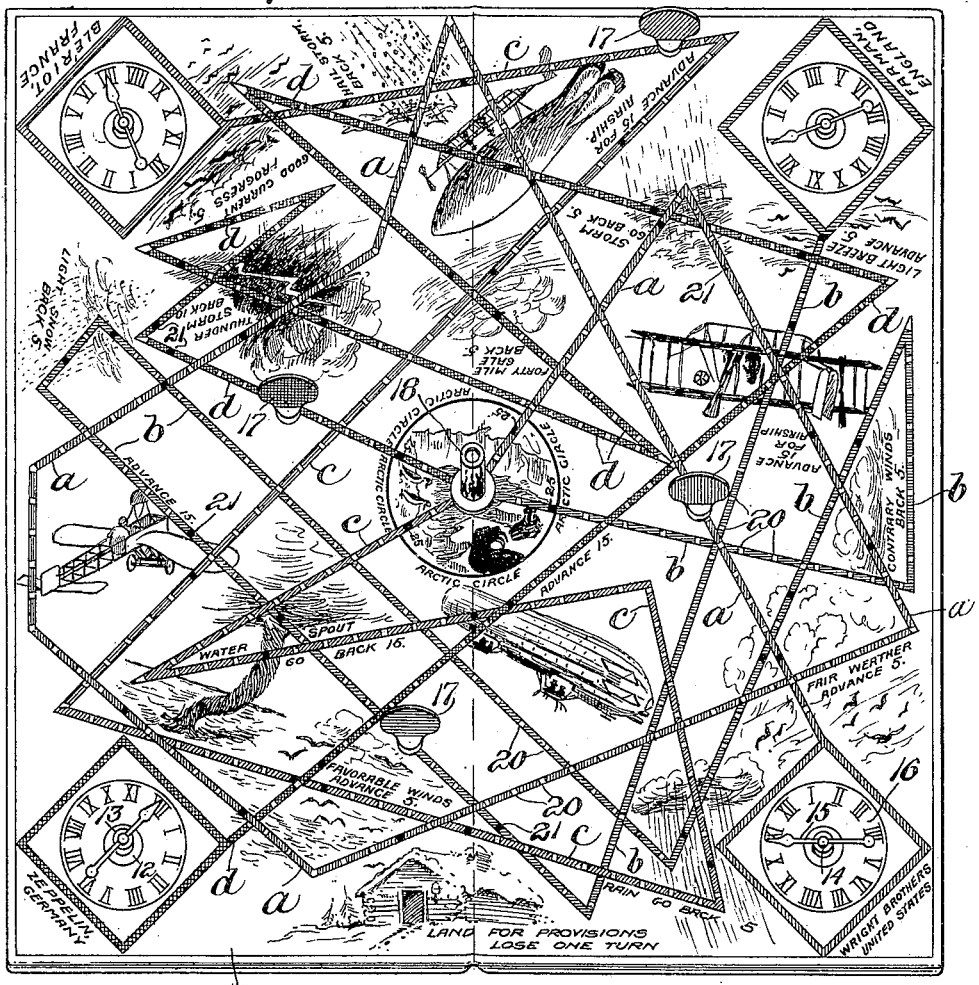
Fig. 2.
Fig. 3.
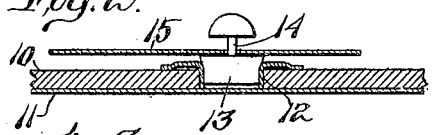
Fig. 4.
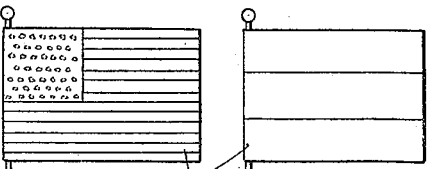
Fig. 5.
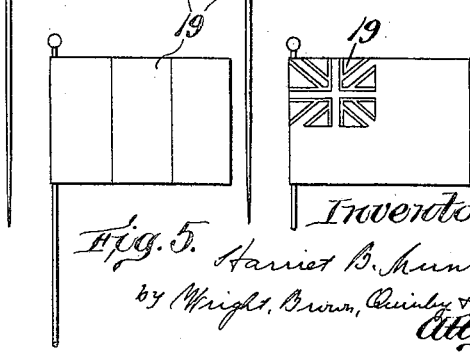
Witnesses:
F. R. Ronlstone
P. H. Pezzetti
Inventor:
Harriet B. Munro
by Wright, Brown, Quinby & May
Attys.

UNITED STATES PATENT OFFICE.

HARRIET B. MUNRO, OF BRISTOL, RHODE ISLAND.

GAME APPARATUS.

979,392. Specification of Letters Patent. Patented Dec. 20, 1910.

Application filed September 20, 1909. Serial No. 518,660.

*To all whom it may concern:*

Be it known that I, HARRIET B. MUNRO, of Bristol, in the county of Bristol and State of Rhode Island, have invented certain new and useful Improvements in Game Apparatus, of which the following is a specification.

This invention relates to game apparatus of the type employing a board and counters or movable pieces, and the object of the invention is to provide an apparatus of this character whereby several players may find entertainment by carrying out a representation of an international race for the pole by airships.

To this end the invention consists in the apparatus substantially as hereinafter described and claimed.

Of the accompanying drawings,—Figure 1 is an isometric view of the board, with the movable pieces thereon. Fig. 2 represents a section through a portion of the board carrying a pointer and dial. Fig. 3 is a side elevation of a movable centerpiece to represent the North Pole. Fig. 4 is an elevation of one of the movable counters. Fig. 5 shows four small flags of the countries indicated on the board in Fig. 1.

Similar reference characters indicate the same members in all of the views.

The board 10 may be of any suitable material, such as two paste-board leaves having a fabric backing 11, to provide for folding the board in a well known way. Near each corner of the board is a socket 12 into which there is removably fitted a plug 13 carrying a headed spindle 14 on which a pointer 15 is pivoted. This structure of the plug and socket is to enable the pointer to be removed when the board is to be folded up. A dial 16, consisting of a circular series of any suitable numerals or ordinals is employed in connection with each pointer for use in the manner hereinafter described.
Four counters 17 which are shown as balloon-shaped pieces having bases so that they may stand upright, are used to enable each player to locate the amount of advance or retreat of his airship. I preferably also employ a removable objective piece such as indicated at 18, said piece having a base to enable it to stand upright, and is preferably hollow and is also preferably pictured to indicate the North Pole. Four small flags 19, each having a staff, are also preferably employed for use in the manner hereinafter described.

Starting from a point at or adjacent to each dial, is a colored stripe having various zigzag directions, and finally reaching the center of the board. The four routes so indicated have distinctive colors. For instance, the route or stripe *a*, leading from the U. S. field at the lower right-hand corner of Fig. 1, may be red, the route from the English field at the upper right-hand corner of Fig. 1, may be blue, the route from the French field at the upper left-hand corner of said figure may be purple, and the route from the German field at the lower left-hand corner of said figure may be yellow. To distinguish the four routes shown in Fig. 1, they are indicated respectively at *a*, *b*, *c* and *d*, in the order above mentioned. Each route has equally-spaced, step markings 20, said markings being spaced sufficiently far apart to enable them to be counted and to enable a counter, 17, to be placed on any one of them or to be placed between any two of them. As stated the markings 20 which are herein referred to for convenience as steps, are equally spaced from the point where the route starts from its field to the point where it reaches the center of the board which, in this case, is the center of the Arctic Circle and comprises the objective point. But each stripe or route is also provided at indefinite intervals with what I refer to, for convenience, as adventure points 21. These adventure points are indicated on the board in any suitable way to distinguish them from the step-markings 20. Pictured on the board in suitable locations are various representations of adventures or conditions liable to be met with by an airship, and the adventure points 21 are located near these pictured representations. I preferably also print descriptive words in connection with the pictures, to facilitate the playing of the game in the manner which I will now describe.

The game may be played by two, three or four persons and of course the countries involved may be other than those represented or indicated in Fig. 1. Referring, however, to the illustration given, the players first decide which country shall be taken by each of them, and each player then takes possession of the flag, the balloon counter and the dial which belong to that country. The

North Pole, or objective-piece 18, is placed at the center of the Arctic Circle which is also the point where the four routes a, b, c and d, meet or intersect. The players twirl their pointers and that player whose pointer stops at the highest number begins the game by counting the steps 20 from the corner of the square where his dial is located, then setting his counter as many steps of advance along the colored stripe or route as his pointer indicated when it stopped rotating. Each player does this in turn, and therefore the amount of advance each airship may gain is chance-controlled. Each airship is supposed to meet with various adventures and changes in weather conditions which affect its course. If the count for the advance of a piece 17, falls on one of the adventure points 21, the direction on the board both by picture and words compels that player to retreat. Some of the adventure points, however, provide for an extra advance. For instance, if the amount of advance permitted by counting the steps given to the player by the rotation of his pointer would result in his counter landing on a point 21 adjacent to the "Contrary winds" shown at the right of Fig. 1, then he would have to set his counter back five points. On the other hand if his counter would land on an adventure point adjacent to the "Fair weather," then he would be permitted to have an extra advance of five points or steps. If his counter landed on one of the points 21, shown near the bottom of Fig. 1, that player would lose his next turn for actuating his pointer. And any player whose counter landed on the point close to the Arctic Circle would have to move back 25 points or steps. The player who succeeds in reaching the pole or in passing by it first, wins the game and may be supposed to nail his flag to the pole in token of victory by placing the staff of his flag in the space at the top of the objective-piece 18.

The counters 17, in practice, are colored to correspond with the colors of the stepped-routes with which they are to be used, and any suitable colors may be employed. That is, I do not limit myself to any particular selection of colors nor do I limit myself to the particular pictures or the directions in which the stripes or routes lead, nor to the shapes of the counters.

The board may be, of course, any surface provided with the markings, colorings and illustrations for playing the game described. It will be understood, of course, that the receptacle in the objective-piece 18 may be utilized by the winner for placing a message therein or from which he may take a message left by a preceding winner. Or the article left might be of any nature such as a prize.

The game apparatus which I have provided may consist of essential features, as follows:—The objective designation is the line of intersection of the stepped routes a, b, c and d, at the center of the Arctic Circle, or the movable piece 18, might be considered as this objective designation. The colored stripes and their cross-markings 20 constitute stepped routes from several starting points to the pole. The pictorial representations and their accompanying directions as to extra permitted steps of advance or distances of retreat that must be taken, constitute advance-controlling directions. And the dials and pointers constitute chance-devices for controlling the amount of movement that a player may impart to his counter.

Having now described my invention, I claim:

1. A game apparatus comprising a single objective space and a plurality of stepped routes leading thereto from different starting points, and having various zig-zag directions, the zig-zag stretches of each route being of different lengths and angle from the zig-zag stretches of the other routes, all of said routes crossing each other at various points, adventure points being provided for each route and located adjacent the point where said route crosses other routes, advance and retreat directions for each group of adventure points thus provided, whereby each route is subjected to the same advance and retarding conditions.

2. A game apparatus comprising a rectangular board having a central objective space, and a plurality of sockets, one at each corner, a plurality of stepped routes having portions inclosing said sockets to form starting points, all of said routes being of the same length and having various zig-zag directions and leading to said objective point, the zig-zag stretches of each route being of different lengths and angle from the zig-zag stretches of the other routes, all of said routes crossing each other at various points, adventure points being provided for each route and located adjacent the point where said route crosses the other routes, advance and retreat directions for each group of adventure points thus provided, whereby each route is subjected to the same advance and retarding conditions, movable counters for said routes, and chance controlled devices provided with plugs adapted to fit said sockets.

In testimony whereof I have affixed my signature, in presence of two witnesses.

HARRIET B. MUNRO.

Witnesses:
A. W. HARRISON,
P. W. PEZZETTI.